US007913272B2

(12) United States Patent
Sasselli et al.

(10) Patent No.: US 7,913,272 B2
(45) Date of Patent: Mar. 22, 2011

(54) METHOD AND DEVICE FOR UPDATING RECEPTION RIGHTS IN A MULTIPLE OPERATOR SYSTEM

(75) Inventors: Marco Sasselli, Cheseaux-sur-Lausanne (CH); Jean-Luc Bussy, Cheseaux-sur-Lausanne (CH); Philippe Stransky, Cheseaux-sur-Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1593 days.

(21) Appl. No.: 10/311,084

(22) PCT Filed: Jun. 11, 2001

(86) PCT No.: PCT/IB01/01014
§ 371 (c)(1),
(2), (4) Date: Dec. 13, 2002

(87) PCT Pub. No.: WO01/97518
PCT Pub. Date: Dec. 20, 2001

(65) Prior Publication Data
US 2003/0147531 A1 Aug. 7, 2003

(30) Foreign Application Priority Data
Jun. 13, 2000 (CH) .................................. 1159/00

(51) Int. Cl.
*H04N 7/06* (2006.01)
*H04N 7/167* (2006.01)

(52) U.S. Cl. ............................. 725/25; 725/31; 380/210

(58) Field of Classification Search ....................... None
See application file for complete search history.

(56) References Cited

U.S. PATENT DOCUMENTS

| 5,440,632 | A | | 8/1995 | Bacon et al. |
|---|---|---|---|---|
| 5,666,293 | A | * | 9/1997 | Metz et al. .................... 709/220 |
| 5,794,117 | A | * | 8/1998 | Benard ......................... 725/121 |
| 5,835,911 | A | * | 11/1998 | Nakagawa et al. ........... 707/203 |
| 6,373,904 | B1 | * | 4/2002 | Sakamoto et al. ............ 375/316 |
| 2004/0068541 | A1 | * | 4/2004 | Bayassi et al. ................ 709/204 |
| 2006/0072520 | A1 | * | 4/2006 | Chitrapu et al. ............. 370/337 |
| 2006/0271492 | A1 | * | 11/2006 | Candelore et al. ............. 705/57 |

FOREIGN PATENT DOCUMENTS
WO WO 98/43426 10/1998

OTHER PUBLICATIONS
Van Schooneveld, "Standardization of conditional access systems for digital pay television", Abstract Only, Philips Journal of Research, vol. 50, Issues 1-2, pp. 217-215, 1996.

* cited by examiner

*Primary Examiner* — Joseph P Hirl
*Assistant Examiner* — Fred Peng
(74) *Attorney, Agent, or Firm* — DLA Piper LLP US

(57) ABSTRACT

The invention refers to a method of updating a multi-operator reception system by administration (EMM) and updating messages between a subscriber management system and one or several decoders of pay television, being the functioning of the decoder dependent on the reception of administration (EMM) and updating messages of at least one preferential operator, this decoder having to pass into stand-by state under certain conditions.

Figure 1:
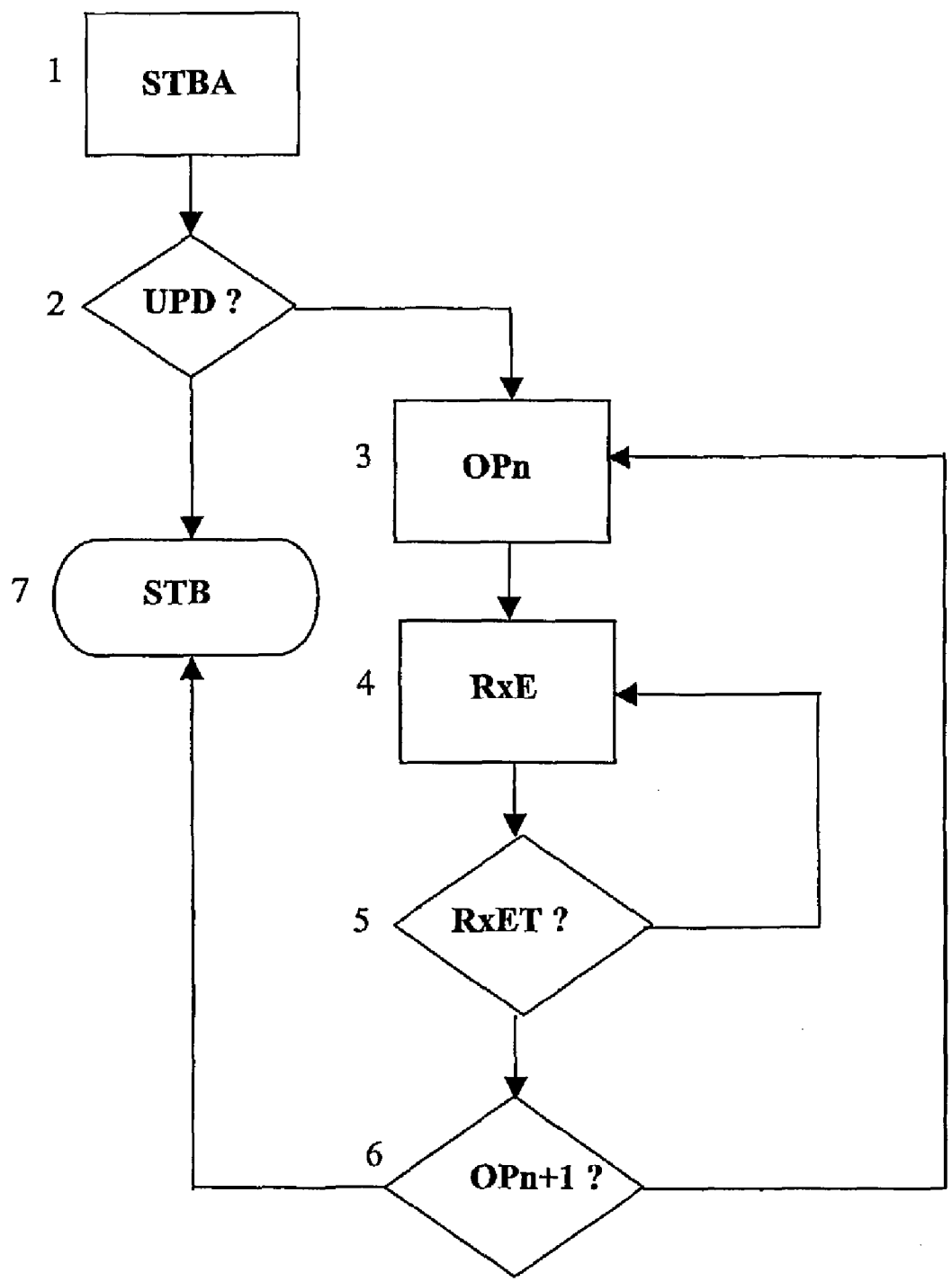

If the subscriber uses mostly an operator that does not require subscription rights, the decoder does not receive any more the necessary updating.

To switch this decoder into the stand-by state, the method according to the invention carries out the following operations:

switching of the reception to one or several preferential operators,
receiving and processing of the messages of management of rights (EMM),
determining of the end of a complete cycle of reception messages,
switching to the stand-by state.

8 Claims, 1 Drawing Sheet

METHOD AND DEVICE FOR UPDATING RECEPTION RIGHTS IN A MULTIPLE OPERATOR SYSTEM

The present invention concerns the field of pay television.

Distributed systems are known in which an operator transmits to a group of subscribers one or several services called pay television. These services can be coded or in clear, and they are received and eventually decoded by means of a decoder or Integrated Receiver Decoder (IRD) installed in the subscriber's unit of said services.

In these known systems the subscriber's decoder changes automatically to a function mode called stand-by in order to save energy in agreement with regulations for this purpose such as EPA 2000, defining the maximum consumption of an electric device in stand-by mode. The subscriber also voluntarily disconnects his/her decoder frequently for the same reason.

The present trend is to multiply the offer of services proposed to the subscriber, said services using the same physical supports, notably the satellite. The transports used by these physical supports are based on the choice of a particular frequency associated to the transport. On this particular frequency associated to the transport we can include several services of the same operator in the numerical technology of pay television.

In order to increase the offer of services proposed to the subscriber certain decoder manufacturers propose scanning methods (we understand by scanning the means of analysis of the video flux entering in the subscriber's material) that allow the subscriber to select the group of emissions transmitted in clear, that is, free of charge, in addition to any pay channel or service. This scanning selection allows the subscriber to view the services other than the preferential service. These services other than the preferential service form part of the same reception space, for example they pass through the same satellite. Consequently, the transports that use these physical supports can be associated with different operators. Some of these operators can transmit television emissions free of charge, others can transmit pay selections with a certain type of access control called preferential, and others can transmit using a different access control to the preferential access control. In this context each operator has one or several transports or frequencies that are reserved for him/her.

This situation presents certain inconveniences. On the one hand, when the subscriber is receiving programmes from a non-preferential operator (that is, only using corresponding transports or frequencies) and rarely chooses to receive the services of this preferential operator the decoder or IRD stops receiving management and updating messages, commonly named EMM in the profession, that are transmitted with the video flux and normally are interpreted by the decoder. On the other hand this inconvenience occurs equally when the decoder is stopped: in fact, a decoder stopped by the subscriber ceases to receive the messages transmitted with the video flux.

These EMM messages are important for the functioning of the above-mentioned distributed system. The consequence is that the subscriber will not receive the updating of his/her rights as well as the logical updating linked in most cases to a security module that is compatible with the decoder that is generally presented in the form of a smart card.

When the subscriber has selected a service subject to a subscription the EMM are sent to the decoder in a cyclic way, each cycle having a duration of about several minutes. This duration depends on the pass bands agreed with the EMM and on the number of EMM to be transmitted, but it normally does not exceed one hour. If the decoder is disconnected, inoperative, or in stand-by mode for a very long time, for example if the subscriber leaves his/her home for several weeks, this subscriber is normally not surprised to have his/her rights degraded, especially if he/she has not paid a bill during this period of time. On the contrary, if the subscriber uses his/her decoder to view channels of a non-preferential operator, for example channels free of charge, during several hours or even several days, it is not acceptable for him/her to find a loss of rights, or degraded rights when he/she wants to view again the services of the preferential operator.

Thus, there is at present a problem that has not been solved in a satisfactory way in order to ensure a correct functioning of the system when the decoder of the subscriber is not used for viewing pay channels of a preferential operator during a relatively long period of time.

This problem is solved by the method described in the characterising part of claim 1.

The way in which the method works is the following. When the normal conditions of functioning of the decoder are met for a passage in stand-by mode, for example for saving electric energy, this passage is delayed during a transitory phase of functioning whose duration is chosen in order to ensure the reception of the EMM during at least one cycle of transmission of the EMM related to one of the access controls used by one of the operators. During this transitory phase the IRD decoder is automatically switched to the preferential operator.

In a particular embodiment of the invention, the access control system installed in the operator's unit calculates the duration of the transitory phase notably but not exclusively depending on the pass band agreed with the EMM and the number of EMM to be sent in a cycle and sends the result of the calculation to the group of decoders of the distributed system. Particularly, the number of EMM to be sent can depend greatly on certain conditions linked to the calendar day. Thus, at the end of a given month, many subscribers are likely to renew their subscription to any given service. In these conditions of seasonality we know that the average number of EMM to be transmitted will be greater at the end of the month than for example at the middle of the month. The access control system can then foresee a supplementary security margin linked to this seasonality.

In this embodiment the head-end of the sending installation, for example five days before the end of the month, sends the following sequence of messages to the decoders installed in the subscribers' units:

1) High priority message sent during five minutes to the decoders whose number is comprised between m and n, where n minus m equals for example a thousand: pass the duration of the transitory phase of functioning from one hour to three hours.
2) High priority message sent to the decoders whose number is comprised between n and p, where p minus n equals also a thousand: pass the duration of the transitory phase of functioning from one hour to three hours, and so on until the totality of the decoders has received such a high priority message.

This way of proceeding allows not to disturb the functioning of the system by a high priority message transmitted to all the decoders without exception. Such a message called universal can generate problems because its high priority character makes it interfere with other routine messages that do not benefit from the same priority but whose execution is however important; the abovementioned way of proceeding allows to limit these problems to a certain segment of number of decoders, which allows to optimise the later management and solving of such problems.

When the peak of the end of the month is passed, the head-end of the installation sends a message, for example three days after the beginning of the next month, according to the same modalities, returning the duration of the transitory phase of functioning to a smaller value such as one hour. The operator can thus decide to benefit this return message of a normal lower priority.

The invention also concerns a decoder that functions following the abovementioned method. Hereinafter the state of the decoder corresponding to the transitory phase of functioning will be called transitory state.

In the transitory state the decoder does not decode the flux of video and consequently does not send any signal to the television; it only carries out operations of reception of associated messages such as ECM and EMM. In the absence of reception of a television programme the ECM messages are particularly useful to maintain the time in the conditional access sub-system, that is, the smart card inserted in the decoder.

The stand-by state is normally the state in which the decoder passes to the end of the transitory phase of functioning according to the invention. When it has been stopped manually by the subscriber, without the device being switched off, this is the state normally known as "Off", for example on the start switch of the decoder or on the remote control. In the stand-by state the decoder does not ensure the display, decoding, nor the reception of associated messages.

In case we wish to avoid that disconnecting the decoder from the current source affects negatively the efficiency of the method according to the invention it is necessary to foresee an autonomous energy source for the decoder. This source of energy has to have a duration long enough to ensure the desired functioning during the transitory phase. Such an energy source can in a known way consist of a battery.

In a first embodiment of the invention the passage to transitory phase of functioning can be carried out with a classic electromechanical relay subject to a temporisation. These relays command in a known way the passage to the transitory state.

In another embodiment the passage and the maintenance in the transitory state is ensured only by software functions, the electronic components present in the decoders being in charge of the passage to the transitory state, the duration of this transitory state, and finally the passage of the decoder to the stand-by state when the prescribed duration for the transitory state is reached.

This embodiment particularly concerns the decoders supplied with special equipment commonly named "timer" that commands in a programmable way the starting of the decoder. In this type of decoders the invention preferably uses the functions of this timer.

According to an embodiment of the invention, when the subscriber has previously selected the preferential operator for a duration at least equal to the period, the transitory phase is simply eliminated, the decoder having received all the necessary information to be updated.

In an intermediate embodiment, if the duration of normal functioning of the preferential operator is lower than the period, the duration of the transitory phase will be adjusted so that the addition of the duration of use and the transitory phase correspond to the period.

This invention is not limited only to the reception of the EMM messages from a preferential operator but can be applied to several operators needing the updating of the rights referring to them. During the transitory phase the decoder will scan the respective channels of the operators in order to update the data of each one before switching to the stand-by state.

According to another embodiment of the invention the decoder is in itself capable of determining the period. This period is defined as the time that separates the repetition of the EMM messages. It is the decoder, when entering in transitory mode, who will memorise the first EMM message and will wait to declare the end of the period when the same EMM message will be sent again. The transitory duration will be just the necessary duration for the updating of the rights. In case the duration of the repetition of the message exceeds the pre-defined maximum period the decoder passes into the stand-by state at the end of this period.

The invention will be better understood with the help of the following detailed description that refers to the only FIGURE, which is given as a non-limiting example and in which a flow chart of the functioning of the invention is described.

This FIGURE shows the different stages of the procedure of stand-by of the decoder mentioned in the invention as well as their succession in the different possible cases:

Case 1: no reception of rights is necessary.

When the stand-by is activated by the entrance in the STBA block, and the UPD test of the necessity of an updating is carried out on the base of the previous functioning of the decoder. In fact, if the decoder was already on a channel delivering management information the decoder will be able to pass directly to the stand-by state STB.

Case 2: a reception of rights is necessary.

When the stand-by is activated (STBA) and the UPD test has shown that the decoder was not on a channel that delivered management information, then it switches the reception on the preferential operator OPn; it receives and processes the messages of administration and updating EMM (RxE) until the complete cycle is finished according to the criteria defined above, this test is represented by the rhomb RxET.

Once the end of the cycle is established the decoder carries out a test of the necessity of an updating for another operator (OPn+1), and if this test is negative it passes to the stand-by state (STB).

Case 3: an updating is necessary for another operator.

If the OPn+1 test is positive the decoder switches the reception on the next preferential operator (n+1) and begins again the procedure of reception and processing of the administration and updating messages EMM until the complete cycle is finished for this operator.

When all the preferential operators have been processed the decoder then passes to the stand-by state.

According to an embodiment, in each entrance in the procedure of stand-by only one preferential operator will be processed before passing into the stand-by state. The processing of all the preferential operators is then carried out by changing the operator when entering in the procedure of stand-by.

The invention claimed is:

1. A method for updating reception rights of a decoder in a multi-operator pay television reception system, the decoder including a first processor and being connected to a security module, the security module including a security module processor and a memory in which reception rights are stored, the method comprising the steps of:
　making by the first processor a determination to enter into a stand-by mode in which no administration messages are received by the decoder;
　after making the determination, switching to a transport associated with a preferential operator;

receiving by the decoder a plurality of administration messages comprising a complete cycle of administration messages on the transport, the plurality of administration messages configured to include a reception right;

updating the reception rights stored in the memory of the security module; and switching to the stand-by state after the plurality of administration messages has been received and the reception rights have been updated;

wherein the receiving step includes the steps of detecting when a complete cycle of administration messages has been received by determining when a duplicate administration message has been received, and wherein the switching step is performed if a duplicate administration message is not received within a predetermined period of time.

2. The method of claim 1, wherein the decoder is capable of receiving transmissions from more than one preferential operator and wherein the switching and receiving steps are performed for each preferential operator.

3. The method of claim 1, wherein a time required to receive a complete cycle of administration messages is predetermined.

4. The method of claim 1, wherein a period of time necessary to receive the complete cycle of administration messages is determined prior to making a determination to enter into the stand-by state and the receiving step is performed for the period of time.

5. The method of claim 1, wherein the receiving step is performed for a period of time defined in a message received by the decoder.

6. The method of claim 1, further comprising the step of determining a period of time required to receive a complete cycle of administration messages based at least in part on a period of time during which the decoder was connected to the preferential operator prior to the step of making a determination to enter into the stand-by mode.

7. A pay television decoder, comprising:

a receiver capable of receiving a plurality of channels, at least one channel including at least one administration message comprising a reception right;

a security module associated with the decoder, the security module including a security module processor and a memory for storing reception rights; and a first processor, the first processor being configured to perform the steps of:

making a determination to enter a stand-by state in which no administration messages-are received by the decoder;

switching the receiver to the at least one channel including administration messages after making the determination;

receiving a plurality of administration messages comprising a complete cycle of administration messages, the plurality of administration messages including at least one reception right;

processing administration messages received on the at least one channel;

updating the reception rights stored in the memory of the security module; and entering the stand-by state after the administration messages received on the at least one channel have been processed and the stored reception rights have been updated;

wherein the receiving step includes the steps of detecting when a complete cycle of administration messages has been received by determining when a duplicate administration message has been received, and wherein the entering step is performed if a duplicate administration message is not received within a predetermined period of time.

8. The pay television decoder of claim 7, wherein the first processor is configured to perform the switching and processing steps for a plurality of channels corresponding to different preferential operators.

* * * * *